United States Patent
Hosomi

(10) Patent No.: US 8,015,372 B2
(45) Date of Patent: Sep. 6, 2011

(54) APPARATUS AND METHOD FOR MEMORY MIGRATION IN A DISTRIBUTED MEMORY MULTIPROCESSOR SYSTEM

(75) Inventor: Takeo Hosomi, Minato-ku (JP)

(73) Assignee: NEC Corporation, Tokyo (JP)

( * ) Notice: Subject to any disclaimer, the term of this patent is extended or adjusted under 35 U.S.C. 154(b) by 345 days.

(21) Appl. No.: 12/364,841

(22) Filed: Feb. 3, 2009

(65) Prior Publication Data

US 2009/0198925 A1 Aug. 6, 2009

(30) Foreign Application Priority Data

Feb. 6, 2008 (JP) ................................ 2008-026381

(51) Int. Cl.
*G06F 12/00* (2006.01)
(52) U.S. Cl. ................. 711/156; 711/165; 711/E12.001
(58) Field of Classification Search .................. None
See application file for complete search history.

(56) References Cited

U.S. PATENT DOCUMENTS

| | | | |
|---|---|---|---|
| 6,546,465 B1 * | 4/2003 | Bertone | 711/144 |
| 7,080,214 B2 * | 7/2006 | Peterson et al. | 711/141 |
| 2005/0086438 A1 * | 4/2005 | Peterson et al. | 711/141 |

FOREIGN PATENT DOCUMENTS

JP   2004-054931 A   2/2004

* cited by examiner

*Primary Examiner* — Kevin Verbrugge
(74) *Attorney, Agent, or Firm* — Sughrue Mion, PLLC

(57) ABSTRACT

A distributed memory multiprocessor system including a plurality of cells interconnected via an inter-cell network, each of the plurality of cells including at least one cache, a memory, a memory controller, and a directory managing a status of data stored in the memory, the distributed memory multiprocessor system includes a directory information updating unit of a first cell that updates the directory of the first cell, and a directory information transmitting unit of a second cell that transmits the directory information contained in the directory of the second cell. The directory information transmitting unit of the second cell transmits the directory information, which is read out from the directory of the second cell, to the first cell. And, the directory information updating unit of the first cell receives the directory information transmitted by the directory information transmitting unit of the second cell and updates the directory of the first cell.

18 Claims, 5 Drawing Sheets

Fig. 1
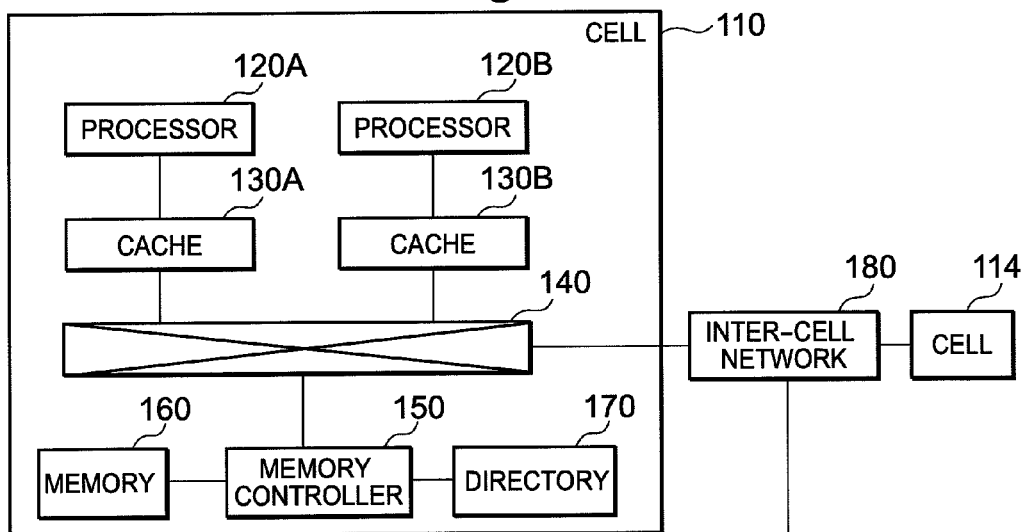
Fig. 2
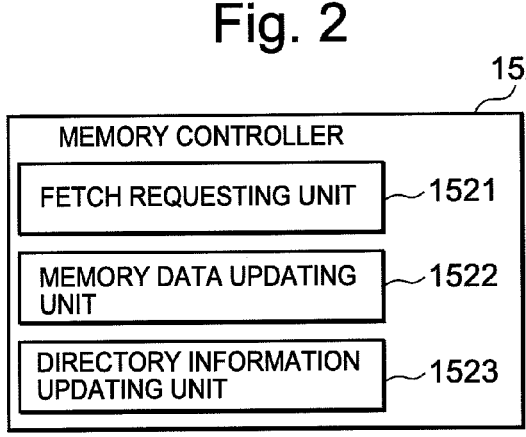
Fig. 3
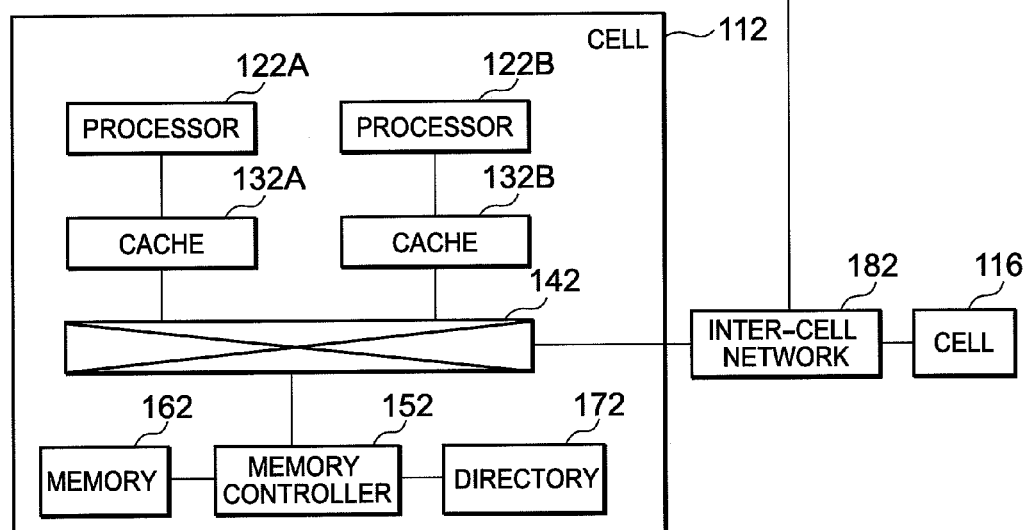
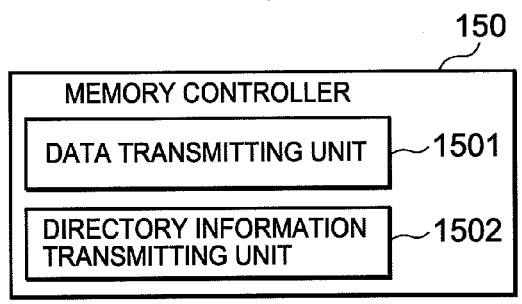

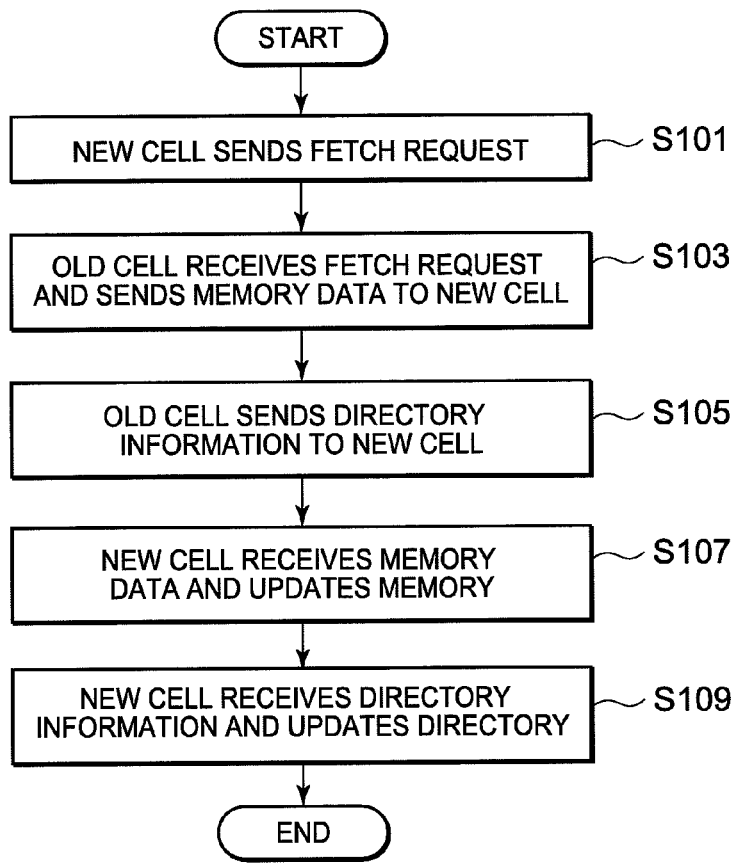
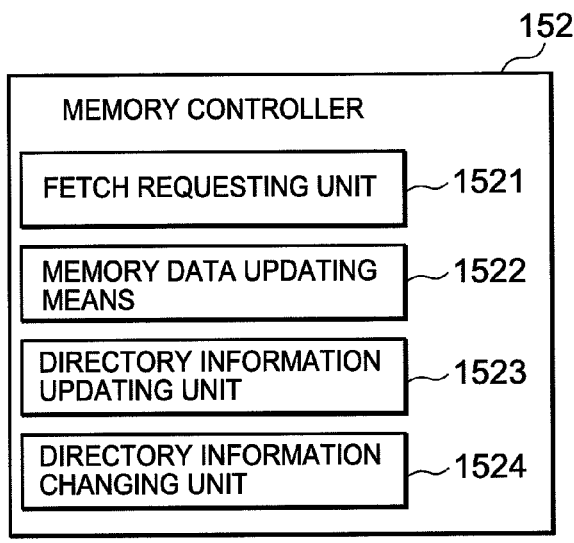

_US 8,015,372 B2_

APPARATUS AND METHOD FOR MEMORY MIGRATION IN A DISTRIBUTED MEMORY MULTIPROCESSOR SYSTEM

This application is based upon and claims priority from Japanese patent application No. 2008-26381, filed on Feb. 6, 2008 in the Japanese Patent Office, the disclosure of which is incorporated herein its entirely by reference.

BACKGROUND

1. Field of the Invention

The present invention relates to an apparatus and method for memory migration in a distributed memory multiprocessor system.

2. Description of the Related Art

A technique for memory migration in a distributed memory multiprocessor system is disclosed in Japanese Patent Laid-Open No. 2004-054931 (Hereinafter, "Patent Document 1"). The related art will be described below with reference to the drawings.

FIG. 8 shows a configuration of a distributed memory multiprocessor system according to the related art.

The system includes four cells 510, 512, 514, 516, which are interconnected through inter-cell networks 580 and 582. The cell 510 includes two processors 520A and 520B, which are connected to caches 530A and 530B, respectively. The cell 510 further includes a memory controller 550 connected to a memory 560 and a directory 570. An intra-cell network 540 interconnects the caches 530A, 530B, the memory controller 550, and the inter-cell network 580.

In order to ensure that the latest data in the system is provided in response to access from a processor to any address, cache coherency control is performed. To implement the cache coherency control, directory information is stored in the directory on a line by line basis, where a line is a unit to be fetched from a cache. The directory information includes a bitmap indicating which cell's cache holds data and a clean bit indicating whether the data in the memory is the latest data. Here, the directory information for data stored in the memory 560 is held in the directory 570 in the same cell 510.

When migrating from the memory 560 in the cell 510 to the memory 562 in another cell 512 in the system, the cell 510 is referred to as the old cell 510 and the cell 512 is referred to as new cell 512. FIG. 9 shows details of that the memory controller 552 for the new cell 512. FIG. 10 shows details of the memory controller 550 for the old cell 510.

The memory controller 552 of the new cell 512 has a fetch requesting unit 5521 and a memory data updating unit 5522. The memory controller 550 of the old cell 510 has an invalidating unit 5501 and data transmitting unit 5502.

The flowchart in FIG. 11 shows the operation of migrating one line of data from the memory 560 of the old cell 510 to the memory 562 of the new cell 512 in the system.

At step S501, the fetch requesting unit 5521 of the memory controller 552 of the new cell 512 sends to the old cell 510 a fetch request to fetch a line to be migrated. At step S503, the invalidating unit 5501 of the memory controller 550 of the old cell 510 receives the fetch request and performs a process for invalidating the line of data held in a cache in the system in accordance with information stored in the directory 570. After the invalidating process performed at step S503 is completed, the data transmitting unit 5502 of the memory controller 550 transmits the line of data to the new cell 512 at step S505. At step S507, the memory data updating unit 5522 of the memory controller 552 of the new cell 512 which received the data updates the memory 562. Here, the information stored in the directory 572 is initialized to a state indicating that none of the caches in the cells hold data and the latest data is contained in the memory.

Once the process described above is completed, an access request to the line is redirected from the old cell 510 to the new cell 512 and the information stored in the directory 572 of the new cell 512 indicates that none of the caches of the cells hold data and the latest data is contained in the memory. Therefore, the line can be migrated from the old cell 510 to the new cell 512 while coherency is maintained.

In the related art, when data is transferred from the old cell to the new cell with the memory migration, the cache holding the line in the multiprocessor system is invalidated. Therefore, the related art has a problem that a cache miss occurs in the processor that was accessing the old line, leading to performance deterioration.

SUMMARY

An aspect of certain embodiments of the present invention is to implement memory migration without invalidating a cache. Embodiments of the present invention also overcome disadvantages not described above. Indeed, certain embodiments of the present invention may not overcome any of the problems described above.

Another aspect of certain embodiments of the present invention concerns a distributed memory multiprocessor system including a plurality of cells interconnected via an inter-cell network, each of the plurality of cells including at least one cache, a memory, a memory controller, and a directory managing a status of data stored in the memory. The distributed memory multiprocessor system includes a directory information updating unit of a first cell configured to update the directory of the first cell, and a directory information transmitting unit of a second cell configured to transmit the directory information contained in the directory of the second cell. The directory information transmitting unit of the second cell transmits the directory information, which is read out from the directory of the second cell, to the first cell. And, the directory information updating unit of the first cell receives the directory information transmitted by the directory information transmitting unit of the second cell and updates the directory of the first cell.

Yet another aspect of certain embodiments of the present invention concerns a memory controlling apparatus, included in a cell that is connected with at least one other cell. The memory controlling apparatus includes a directory updating unit configured to update a directory of the cell that manages a status of data stored in a memory of the cell. The directory information updating unit receives information about the directory of the other cell, transmitted from the other cell, and updates the directory of the cell.

Still another aspect of certain embodiments of the present invention concerns a memory controlling apparatus, included in a cell that is connected with at least one other cell. The memory controlling apparatus includes a directory information transmitting unit configured to transmit information of a directory, which manages a status of data stored in a memory of the cell, to the other cell, and a data transmitting unit configured to transmit data in the memory of the cell to the other cell. Upon receiving a fetch request for a line to be migrated from the other cell, the directory information transmitting unit reads out the directory information from the directory of the cell and transmits the directory information to the other cell, and the data transmitting unit reads out the line of data to be migrated from the memory and sends the line of data to the other cell.

Yet another aspect of certain embodiments of the present invention concerns a memory migration method in a distributed multiprocessor system including a plurality of cells interconnected via an inter-cell network, each of the plurality of cells including one or more caches, a memory, a memory controller, and a directory managing the status of data stored in the memory. The memory migration method includes an information transmitting operation including reading out directory information from the directory of a cell from which a memory is to be migrated and transmitting the directory information to another cell to which the memory is to be migrated, and an information updating operation including receiving the transmitted directory information and updating the directory of the other cell.

Still another aspect of certain embodiments of the present invention concerns a computer readable tangible memory containing a program of instructions for enabling a computer, serving as a memory controlling apparatus included in a cell that is connected with at least one other cell, to execute processes, including receiving process comprising receiving information of the directory of said the other cell transmitted from the other cell, and updating process comprising updating the directory of the cell upon receiving the information of the directory of the other cell.

Another aspect of certain embodiments of the present invention concerns a computer readable tangible memory containing a program of instructions for enabling a computer, serving as a memory controlling apparatus included in a cell that is connected with at least one other cell, to execute processes, including directory information reading-out operation including reading out information of a directory, which manages a status of data stored in a memory of the cell, from the directory of the cell, upon receiving a fetch request for a line to be migrated from the other cell, directory transmitting operation comprising transmitting the read-out directory information to the other cell, data read-out operation including reading out a line of data to be migrated from the memory of the cell upon receiving a fetch request for a line to be migrated from the other cell, and data sending operation including sending the read-out line of data to the other cell.

According to the memory migration in a distributed multiprocessor system of the present invention, caching information in the system can be inherited from an old cell to a new cell by copying directory information of the old cell to the new cell.

BRIEF DESCRIPTION OF THE DRAWINGS

Aspects of embodiments of the present invention will become more apparent by describing in detail embodiments thereof with reference to the accompanying drawings, in which:

FIG. 1 is a diagram showing a configuration of a distributed memory multiprocessor system according to first and second embodiments, FIG. 2 is a diagram showing a configuration of a memory controller 152 of a new cell 112 according to the first embodiment.

FIG. 3 is a diagram showing a configuration of a memory controller 150 of an old cell 110 according to the first embodiment.

FIG. 4 is a flowchart showing an operation flow for memory migration according to the first embodiment.

FIG. 5 is a diagram showing a configuration of a memory controller 152 of a new cell 112 according to the second embodiment.

DETAILED DESCRIPTION OF EMBODIMENTS

First Embodiment

Figures 6, 7:
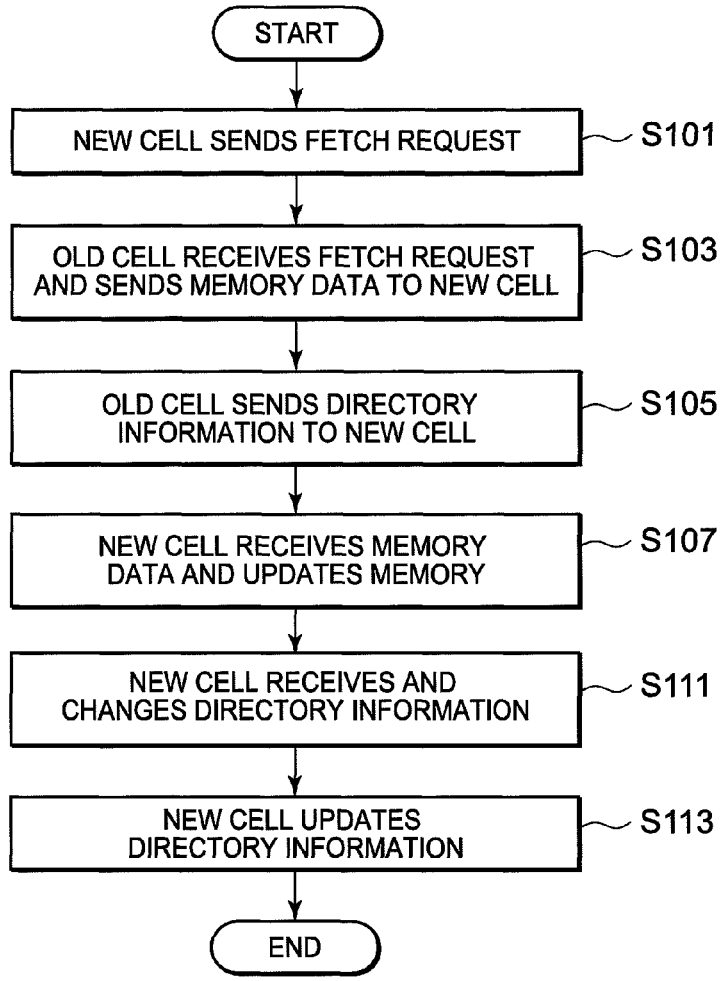
FIG. 6 is a flowchart showing an operation flow for memory migration according to the second embodiment.
FIG. 7 is a diagram showing rules for directory information conversion performed by directory information changing unit 1524 according to the second embodiment.
Figure 8:
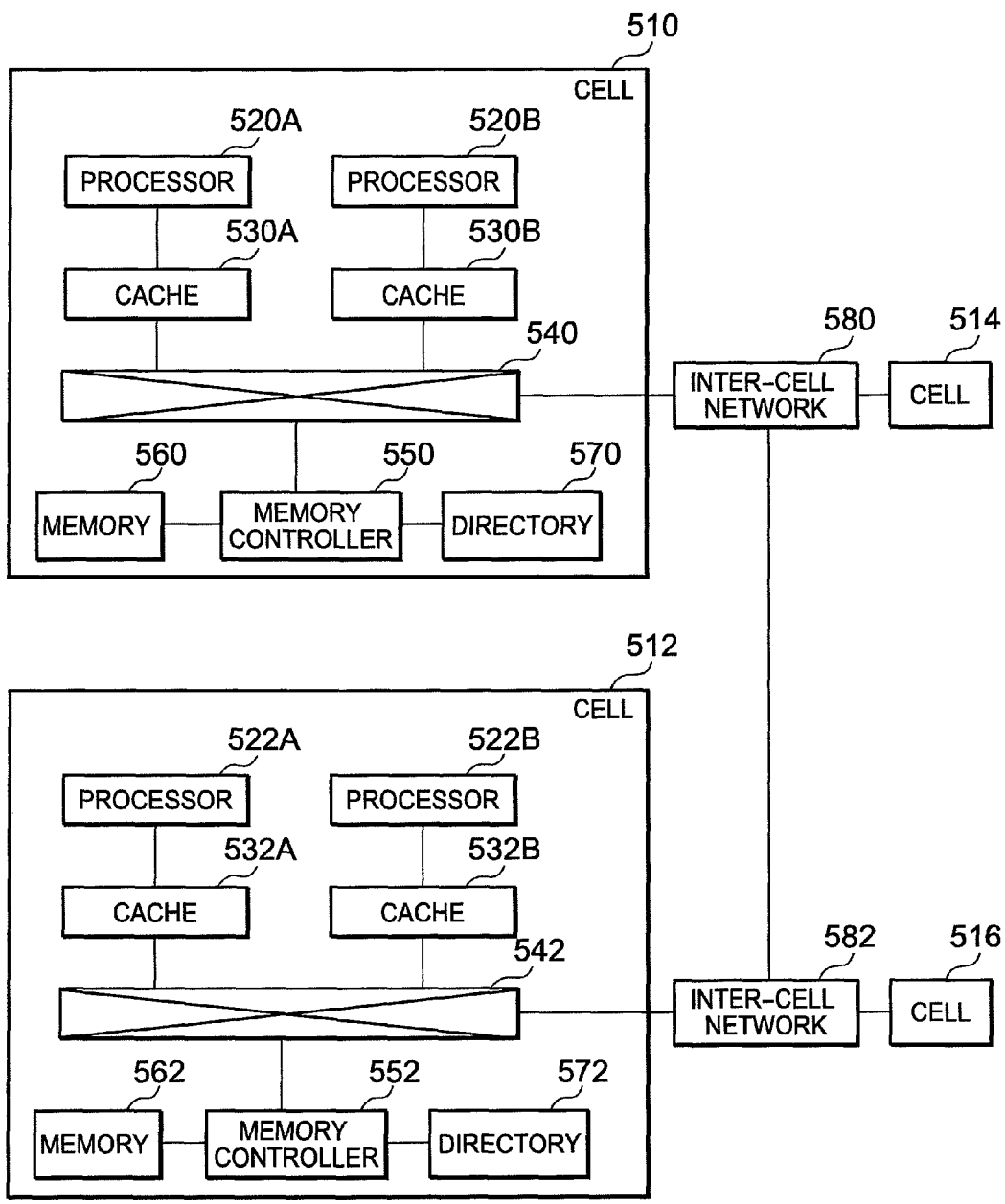
FIG. 8 is a diagram showing a configuration of a distributed memory multiprocessor system according to the related art.
Figure 9:
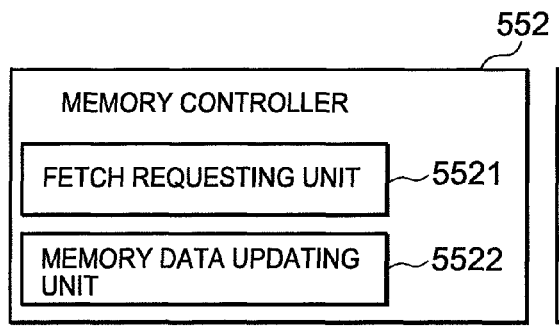
FIG. 9 is a diagram showing a configuration of a memory controller 552 of a new cell 512 according to the related art.
Figure 10:
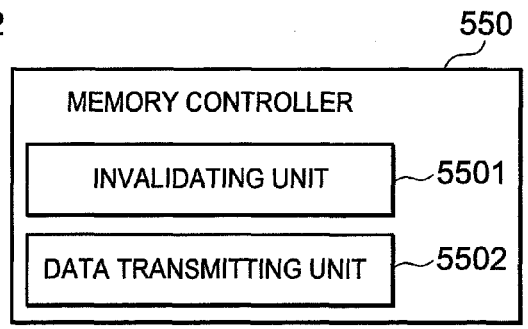
FIG. 10 is a diagram showing a configuration of a memory controller 550 for an old cell 510 according to the related art.
Figure 11:
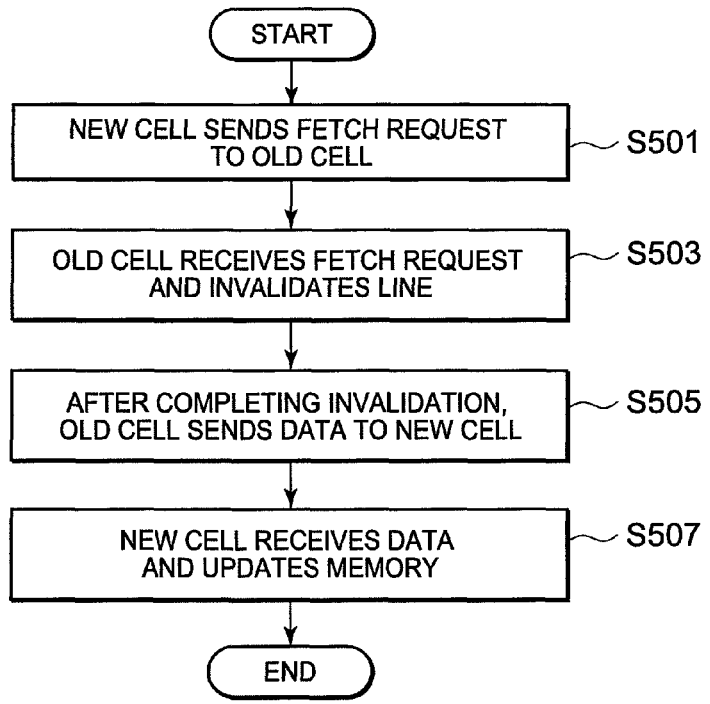
FIG. 11 is a flowchart showing an operation flow for memory migration according to the related art.

A first embodiment of the present invention will be described in detail with reference to the drawings.

FIG. 1 shows a configuration of a distributed multiprocessor system of the present invention.

The system includes four cells 110, 112, 114, 116, which are interconnected through inter-cell networks 180, 182. The cell 110 includes two processors 120A, 120B, which are connected to caches 130A, 130B, respectively. The cell 110 further includes a memory controller 150 connecting to a memory 160 and a directory 170. An intra-cell network 140 interconnects the caches 130A, 130B, the memory controller 150, and the inter-cell network 180.

In order to ensure that the latest data in the system is provided in response to access from a processor to any address, cache coherency control is performed. To implement the cache coherency control, directory information is stored in the directory on a line by line basis, where a line is a unit to be fetched to a cache. The directory information includes a bitmap indicating which cell's cache holds data and a clean bit indicating whether the data in the memory is the latest data. In the exemplary configuration shown in FIG. 1, the bitmap consists of 4 bits because there are four cells in the configuration. When a bit is "1", it indicates that a cache in the corresponding cell holds data; when the bit is "0", it indicates that none of the caches in the cell holds data. When a clean bit is "1", it indicates that data in the memory is the current; when the clean bit is set to "0", it indicates that the data in the memory is not the latest data. When the clean bit is "0", it implies that only one cache in the system holds data. Here, the directory information of data stored in the memory 160 is held in the directory 170 of the same cell 110.

When migration is performed from the memory 160 of the cell 110 to the memory 162 of the cell 112 in the system, the cell 110 is called old cell 110 and the cell 112 is called new cell 112. FIG. 2 shows components that the memory controller 152 of the new cell 112 has for memory migration. FIG. 3 shows components that the memory controller 150 of the old cell 110 has for memory migration.

The memory controller 152 of the new cell 112 includes directory information updating unit 1523 in addition to fetch requesting unit 1521 and memory data updating unit 1522. The memory controller 150 of the old cell 510 includes data transmitting unit 1501 and directory information transmitting unit 1502.

The flowchart in FIG. 4 shows an operation for migrating one line of data from the memory 160 of the old cell 110 to the memory 162 of the new cell 112 in the system.

At step S101, the fetch requesting unit 1521 of the memory controller 152 of the new cell 112 sends to the old cell 110 a fetch request to fetch a line to be migrated. At step S103, the data transmitting unit 1501 of the memory controller 150 of the old cell 110 receives the fetch request, reads out the line of data from the memory 160, and sends the line of data to the new cell 112. At step S105, the directory information transmitting unit 1502 of the memory controller 150 of the old cell 110 reads out directory information of the line from the memory 160 and sends the directory information to the new cell 112. At step S107, the memory data updating unit 1522 of the memory controller 152 of the new cell 112 which received the data updates the memory 162. At step S109, the directory information updating unit 1523 of the memory controller 152 of the new cell 112 which received the directory information updates the directory 172.

Here, the order in which steps S103 and S105 are performed in the old cell 110 may be changed or steps S103 and S105 may be performed concurrently and the data and the directory information may be sent together to the new cell 112. The order in which steps S107 and S109 are performed in the new cell 112 may also be changed or steps S107 and S109 may be performed concurrently.

Once the process described above is completed, an access request to the line is redirected from the old cell 110 to the new cell 112. The procedure of the migration may be the same as the conventional method described in Patent Document 1.

For example, a case is assumed where a cache 130A holds data, the bit that corresponds to the cell 110 is "1" and the other bits are "0" in the bitmap in directory information stored in the directory 170 and the clean bit is "1", which indicates that the memory contains the latest data. By the memory migration process described above, the directory information is copied to the directory 172 without being changed. When an access request is issued from a processor 122A, for example, after the memory migration, the memory controller 152 reads out the directory information from the directory 172, in which the bit corresponding to the cell 110 is "1" and the other bits are "0" in the bitmap, and the clean bit is "1", and can maintain the coherency in accordance with the directory information.

Another case is assumed where for example a cache 130A holds data, the bit corresponding to the cell 110 is "1" and the other bits are "0" in the bitmap in directory information stored in the directory 170 and the clean bit is "0", which indicates that the memory does not contain the latest data. By the memory migration process described above, the directory information is copied to the directory 172 without being changed. When an access request is issued from the processor 122A, for example, after the memory migration process, the memory controller 152 reads out the directory information from the directory 172 in which the bit corresponding to the cell 110 is "1" and the other bits in the bitmap are "0" and the clean bit is "0", and can maintain the coherency in accordance with the directory information.

With the configuration and operation described above, the object of the present invention of providing memory migration without invalidating a cache can be achieved.

In the present embodiment, the directory information transmitted by the directory information transmitting unit includes information for managing the status of data for maintaining coherency, other than addresses. Therefore, in the present embodiment, memory migration can be accomplished without invalidating cache memory.

Second Embodiment

There is a mode in which cache information within a cell is not recorded in the cell as directory information, assuming that the cache information in the cell is always snooped. Coherency in such a directory mode in some cases cannot be maintained by the first embodiment.

For example, a control method may be used in which, when a processor 120A in a cell 110 accesses data in a memory 160, the bits of the bitmap in the directory information are all set to "0" and the clean bit is kept at "1". A problem that arises when the memory migration process described in the first embodiment is performed in that case will be described below. It is assumed here that data has been stored in a cache 130A and updated.

The memory migration process has been performed to migrate a line in the state described above from an old cell 110 to a new cell 112. As a result, information is stored in the directory 172 of the new cell 112 in which the bitmap is set to all "0" and the clean bit is set to "1". Accordingly, when the processor 122A in the cell 112 makes access, the memory controller 152 snoops a cache 132B of another processor 122B in the cell to determine that the cache 132B does not hold the data. The memory controller 152 reads out data from the memory 162 and transfers it to the cache 132A. The cache 132A stores the transferred data. The transferred data differs from the latest data stored in the cache 130A, therefore the coherency is not maintained.

The present embodiment provides a method that accomplishes memory migration without invalidating a cache, which is the object of the present invention, in a mode in which a cell does not record cache information in the cell as directory information.

FIG. 5 shows components that the memory controller 152 of the new cell 112 according to an embodiment of the present invention has for memory migration. Directory information changing unit 1524 is provided in addition to the fetch requesting unit 1521, memory data updating unit 1522, and directory information updating unit 1523 of the first embodiment.

The flowchart in FIG. 6 shows operation for migrating one line of data in the memory 160 of the old cell 110 to the memory 162 of the new cell 112 in the system.

Steps S101 through S107 are the same as those in the first embodiment and therefore the description thereof will be omitted here. Steps S111 and S113 which differ from the first embodiment will be described below.

At step S111, directory information changing unit 1524 of the memory controller 152 of the new cell 112 receives directory information transmitted by the directory information transmitting unit 1502 of the old cell 110 and changes its directory information. The process for changing the directory information will be detailed later.

At step S113, directory information updating unit of the memory controller 152 of the new cell 112 stores directory information changed at step S111 in the directory 172 and updates the directory 172 with the directory information.

Conversion of directory information performed by the directory information changing unit will be described next. Here, it is assumed that the directory information includes a clean bit and a bitmap consisting of as many bits as the number of cells in the system. Memory migration from an old cell 110 to a new cell 112 is assumed. A conversion table used in the conversion is shown in FIG. 7.

For example, if the clean bit is "1" and all bits in the bitmap are "0", there is a possibility that a cache in the old cell 110 holds data and the latest data is not contained in the memory, therefore the clean bit is changed to "0" and only the bit in the bitmap that corresponds to the old cell 110 is changed to "1". If the clean bit is "1" and there is a bit set to "1" in the bitmap, it is guaranteed that the data in the memory is the latest data and therefore the clean bit is kept at "1", and the bit that corresponds to the old cell 110 is changed to "1" and the bit corresponding to the new cell 112 is changed to "0" in the bitmap. If the clean bit is "0" and the bit corresponding to the new cell 112 is "1", only a cache in the new cell 112 holds the data and therefore the clean bit is changed to "1" and the bit in the bitmap that corresponds to the new cell 112 is changed to "0". The change made to the bitmap is equivalent to changing all bits in the bitmap to "0". If the clean bit is "0" and the bits excluding the bit corresponding to the new cell 112 are "1", no change is made.

By performing the process described above, the directory information changing process at step S111 effectively works and coherency can be maintained in the following case, for example.

It is assumed here that a processor 120A in the cell 110 accesses data in the memory 160 and a cache 130A holds the latest data. Here, all bits in the bitmap in the directory information remain "0" and the clean bit remains "1". When the memory migration process described above is performed, the clean bit is changed to "0" and the bit in the bitmap that corresponds to the old cell 110 is changed to "1" at step S111 (See FIG. 7). Once the memory migration is completed, the directory information changed at step S111 to indicate that a cache in the cell 110 is likely to hold the latest data is read out into the directory 172 in response to an access from the processor 122A to the memory controller 152 of the new cell 112. Therefore coherency can be maintained.

Thus, the present embodiment can provide a method for achieving memory migration without invalidating a cache, which is the object of the present invention, in a mode in which a cell does not record cache information in the cell as directory information.

In a variation of the present embodiment, directory information changing unit 1524 of the memory controller 152 of the new cell 112 may change directory information that is present in the memory controller 150 of the old cell 110 and that the directory information transmitting unit reads out from the directory 170, in accordance with the conversion rules in FIG. 7. The directory information changing unit 1524 may be connected to an inter-cell network and the directory information may be transferred from the old cell 110 to the new cell 112 through the inter-cell network.

Conversion performed by the directory information changing unit may be any conversion that can maintain coherency after directory information is transferred to a new cell 112 and is not limited to the conversion rules shown in FIG. 7.

Any of the configurations described in the descriptions of the embodiments can be combined.

The present invention is applicable to memory migration in a system that requires data coherency control.

According to the embodiments of the present invention, memory migration can be achieved without invalidating a cache because caching information in the system can be inherited from an old cell to a new cell by copying directory information of the old cell to the new cell.

While embodiments of the present invention have been described in detail above, it is contemplated that numerous modifications may be made to the above embodiments without departing from the spirit and scope of the embodiments of the present invention as defined by the following claims.

What is claimed is:

1. A distributed memory multiprocessor system including a plurality of cells interconnected via an inter-cell network, each of the plurality of cells including at least one cache, a memory, a memory controller, and a directory managing a status of data stored in the memory, the distributed memory multiprocessor system comprising:
    a directory information updating unit of a first cell configured to update the directory of the first cell; and
    a directory information transmitting unit of a second cell configured to transmit the directory information contained in the directory of the second cell,
    wherein the directory information transmitting unit of the second cell transmits the directory information, which is read out from the directory of the second cell, to the first cell, and
    wherein the directory information updating unit of the first cell receives the directory information transmitted by the directory information transmitting unit of the second cell and updates the directory of the first cell.

2. The distributed memory multiprocessor system according to claim 1, further comprising
    a fetch requesting unit of the first cell configured to send a fetch request;
    a memory data updating unit of the first cell configured to update data in the memory; and
    a data transmitting unit of the second cell configured to transmit data in the memory,
    wherein the fetch requesting unit of the first cell sends the fetch request for a line to be migrated to the second cell,
    the data transmitting unit of the second cell, in response to the fetch request sent by the fetch requesting unit of the first cell, reads out the line of data to be migrated from the memory and sends the line of data to the first cell,
    wherein the directory information transmitting unit of the second cell, in response to the fetch request sent by the fetch requesting unit of the first cell, reads out directory information of the line to be migrated from the directory of the second cell and sends the directory information to the first cell, and
    wherein the memory data updating unit of the first cell receives data sent by the data transmitting unit of the second cell and updates data in the memory of first cell.

3. The distributed memory multiprocessor system according to claim 1, further comprising:
    a directory information changing unit configured to convert the directory information of the line to be migrated.

4. The distributed memory multiprocessor system according to claim 3,
    wherein the directory information changing unit receives the directory information sent from the second cell, converts the directory information, and stores the converted directory information in the directory of the first cell.

5. The distributed memory multiprocessor system according to claim 3,
    wherein the directory information changing unit converts the directory information of the line to be migrated, and sends the converted directory information to the first cell for storage in the directory of the first cell.

6. The distributed memory multiprocessor system according to claim 1,
    wherein the directory information includes information indicating whether data in the memory is the latest data.

7. The distributed memory multiprocessor system according to claim 1,
    wherein the directory information further includes information specifying a cache that holds data.

8. A memory controlling apparatus, included in a cell that is connected with at least one other cell, the memory controlling apparatus comprising:

a directory updating unit configured to update a directory of the cell that manages a status of data stored in a memory of the cell, wherein the directory information updating unit receives information of the directory of said at least one other cell transmitted from said at least one other cell and updates the directory of the cell.

9. The memory controlling apparatus according to claim 8, further comprising:
a fetch requesting unit configured to send a fetch request for a line to be migrated to said at least one other cell.

10. The memory controlling apparatus according to claim 9, further comprising:
a memory data updating unit configured to update data in the memory of the cell,
wherein upon receiving the line of data to be migrated that is sent from said at least one other cell in response to the fetch request sent by the fetch requesting unit, the memory data updating unit updates the data in the memory.

11. A memory controlling apparatus, included in a cell that is connected with at least one other cell, the memory controlling apparatus comprising:
a directory information transmitting unit configured to transmit information of a directory, which manages a status of data stored in a memory of the cell, to said at least one other cell; and
a data transmitting unit configured to transmit data in the memory of the cell to said at least one other cell,
wherein upon receiving a fetch request for a line to be migrated from said at least one other cell, the directory information transmitting unit reads out the directory information from the directory of the cell and transmits the directory information to said at least one other cell, and the data transmitting unit reads out the line of data to be migrated from the memory and sends the line of data to said at least one other cell.

12. A memory migration method in a distributed multiprocessor system including a plurality of cells interconnected via an inter-cell network, each of the plurality of cells including one or more caches, a memory, a memory controller, and a directory managing the status of data stored in the memory, the memory migration method comprising:
an information transmitting operation comprising reading out directory information from the directory of a cell from which a memory is to be migrated and transmitting the directory information to another cell to which the memory is to be migrated; and
an information updating operation comprising receiving the transmitted directory information and updating the directory of said another cell.

13. The memory migration method in a distributed multiprocessor system according to claim 12, further comprising:
a fetch requesting operation comprising sending a fetch request for a line to be migrated to the cell;
a line of data and directory information sending operation comprising reading the line of data to be migrated and directory information and sending the line of data and the directory information to said another cell, in response to the fetch request sent by the fetch requesting operation; and
a memory data updating operation comprising receiving the line of data to be migrated sent by the line of data and directory information sending operation and updating data in the memory of the cell.

14. The memory migration method in a distributed multiprocessor system according to claim 12, further comprising:
a first information changing operation comprising receiving the directory information sent form said another cell, converting the directory information, and storing the converted directory information in the directory of the cell.

15. The memory migration method in a distributed multiprocessor system according to claim 12, further comprising:
a second information changing operation comprising converting directory information of the line to be migrated, and sending the converted directory information to the cell for storage in the directory of the cell.

16. A computer readable tangible memory containing a program of instructions for enabling a computer, serving as a memory controlling apparatus included in a cell that is connected with at least one other cell, to execute processes, comprising:
receiving process comprising receiving information of the directory of said at least one other cell transmitted from said at least one other cell; and
updating process comprising updating the directory of the cell upon receiving the information of the directory of said at least one other cell.

17. The computer readable tangible memory containing the program according to claim 16, further comprising:
fetch requesting process comprising sending a fetch request for a line to be migrated to said at least one other cell.

18. A computer readable tangible memory containing a program of instructions for enabling a computer, serving as a memory controlling apparatus included in a cell that is connected with at least one other cell, to execute processes, comprising:
directory information reading-out process comprising reading out information of a directory, which manages a status of data stored in a memory of the cell, from the directory of the cell, upon receiving a fetch request for a line to be migrated from said at least one other cell;
directory transmitting process comprising transmitting the read-out directory information to said at least one other cell;
data read-out process comprising reading out a line of data to be migrated from the memory of the cell upon receiving a fetch request for a line to be migrated from said at least one other cell; and
data sending process comprising sending the read-out line of data to said at least one other cell.

* * * * *